United States Patent [19]
Donovan et al.

[11] Patent Number: 5,178,886
[45] Date of Patent: Jan. 12, 1993

[54] QUICK PORTS FOR MOLDING

[75] Inventors: Thomas P. Donovan, West Haven; Robert A. Lacko, Oxford, both of Conn.; Joseph A. Valerio, Murrysville, Pa.

[73] Assignee: United Technologies, Corporation, Hartford, Conn.

[21] Appl. No.: 763,189

[22] Filed: Sep. 20, 1991

[51] Int. Cl.$^5$ .............................................. B29C 45/00
[52] U.S. Cl. .................... 425/190; 425/568; 425/569
[58] Field of Search ............... 425/190, 192 R, 567, 425/568, 569, 570, 571

[56] References Cited

U.S. PATENT DOCUMENTS

| | | | |
|---|---|---|---|
| 2,814,831 | 12/1957 | McKee, Jr. | 425/568 |
| 4,069,003 | 1/1978 | Cecchi | 425/568 |
| 4,134,431 | 1/1979 | Davidson et al. | 138/109 |
| 4,242,073 | 12/1980 | Tsuchiya et al. | 425/149 |
| 4,443,177 | 4/1984 | Modur et al. | 425/543 |
| 4,592,886 | 6/1986 | Manneherz | 264/262 |
| 4,653,995 | 3/1987 | Ward | 425/569 |
| 4,797,236 | 1/1989 | Kojima | 264/40.1 |
| 4,990,077 | 2/1991 | Morita | 425/130 |
| 5,002,475 | 3/1991 | Graefe | 425/135 |
| 5,096,410 | 3/1992 | Loulourgas | 425/569 |

FOREIGN PATENT DOCUMENTS

| | | | |
|---|---|---|---|
| 996244 | 12/1951 | France | 425/567 |
| 63-280610 | 11/1988 | Japan | 425/567 |
| 1043055 | 9/1966 | United Kingdom | 425/567 |

Primary Examiner—Jay H. Woo
Assistant Examiner—Scott Bushey
Attorney, Agent, or Firm—McAulay Fisher Nissen Goldberg & Kiel

[57] ABSTRACT

A resin injection port has a tapered outer cylindrical surface, an inner resin passage which is also tapered, and one or more grooves in the outward end thereof to provide a keyway for locking the plastic in the end after cure. The port also has a flange, with a recess matable with a head of a retaining bolt through rotation such that the port is twisted into position for injection. This simultaneously compresses an O-ring which provides a tight seal between the port and the mold. The flange has cut-away portions which align with the bolt head prior to twisting into position. Additionally, the mold has at least one pin which engages a corresponding inner cam surface on the port. The inner cam surface travels over the pins as the flange is twisted to force the port to break the plastic, release and move away from the mold with a ¼ turn. Utilizing such an injection port provides a means for quickly releasing an injection port from a mold without requiring slide hammers or other such devices.

24 Claims, 2 Drawing Sheets

QUICK PORTS FOR MOLDING

TECHNICAL FIELD

This invention relates to molding operations and more particularly to an easily removable resin injection port for a mold.

BACKGROUND

Injection molding is a process in which resin is injected under pressure into a closed mold having a shaped cavity. After the resin is injected, the mold is separated and the shaped plastic part is removed. Such a mold typically has a plurality of ports through which the resin is injected into the cavity, though in some instances only one port is used. The cavity may contain a fiber preform or fiber wound article with the injected resin infiltrating the fibers and subsequently cured to produce a part of fiber reinforced resin.

After the resin is injected into the preform and cured, it is preferred to remove the resin injection ports to break away the plastic which has cured inside the port. If not removed, the resin in the port may lock the part in the mold.

In U.S. Pat. No. 4,797,236, an injection molding method is disclosed, with an injection port shown located in a stationary plate 11. The port has a tapered inner passage which increases in diameter from the outer surface to the inner passages in the mold. The outer surface has no taper and no means are described or shown for removing the port from the mold.

Referring to FIG. 1, a port 1 is disposed in a mold 2 having upper and lower portions 3 and 4 which define a cavity 5. A channel 6 connects a port passage 7 to the cavity to deliver resin thereto. A fiber preform 8 is disposed in the cavity.

Using ports similar to that described above, problems arise in removing the port from the mold. Typically, bolts are used to fasten the injection port to the mold, and these must be removed to release the port. However, in many instances, even after the bolts are removed, the port may not be released as the cured resin is fairly tough and will not break easily. A slide hammer or other device may be required to break the plastic and release the port. When done in this manner, it is difficult to predict where the plastic will break. When not broken properly, the plastic may hinder removal of the cured part from the mold. Also, resin may infiltrate into the space between the port outer surface and the mold, locking the port in the mold and increasing the difficulty of removal.

SUMMARY OF THE INVENTION

It is an object of the present invention to provide a resin injection port which is quickly and easily removed from a mold.

It is a further object to provide a resin injection port which provides a clean break at a designated location to ease mold separation and part removal.

These and other objects of the present invention are achieved by providing a resin injection port comprising a cylinder having a tapered outer surface and a tapered inner passage, the inner passage increasing in diameter towards the interior of the mold and having at least one longitudinal groove at the inboard end thereof. Additionally, the port has an outer flange having means for retaining the flange against the mold, means for gripping the port outwardly of the flange and means for twisting and withdrawing the port in a single motion. Preferably, pins are disposed in the mold which are engagable by cammed surfaces such that during rotation of the flange the cam surfaces force the flange to move outwardly. Consequently, a twisting and withdrawing motion acts on the cured plastic within the passage. The groove located at the end of the port locks the plastic to assure co-rotation which causes the plastic to break at the designated location, releasing the port from the mold quickly and easily.

DETAILED DESCRIPTION OF THE INVENTION

Figure 1:
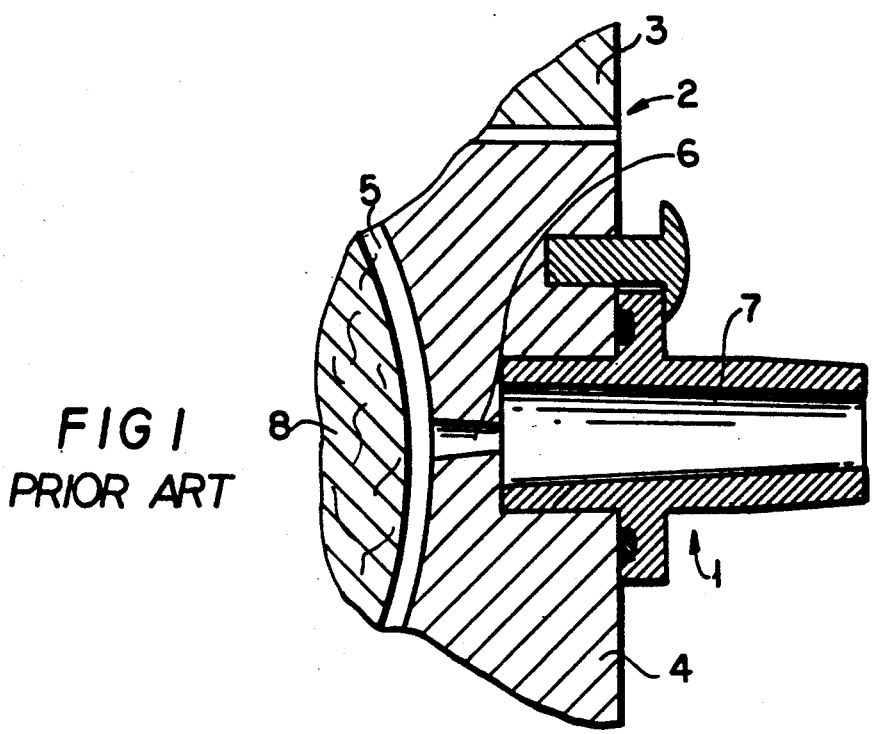
FIG. 1 is a view of a prior art resin injection port
Figure 2:
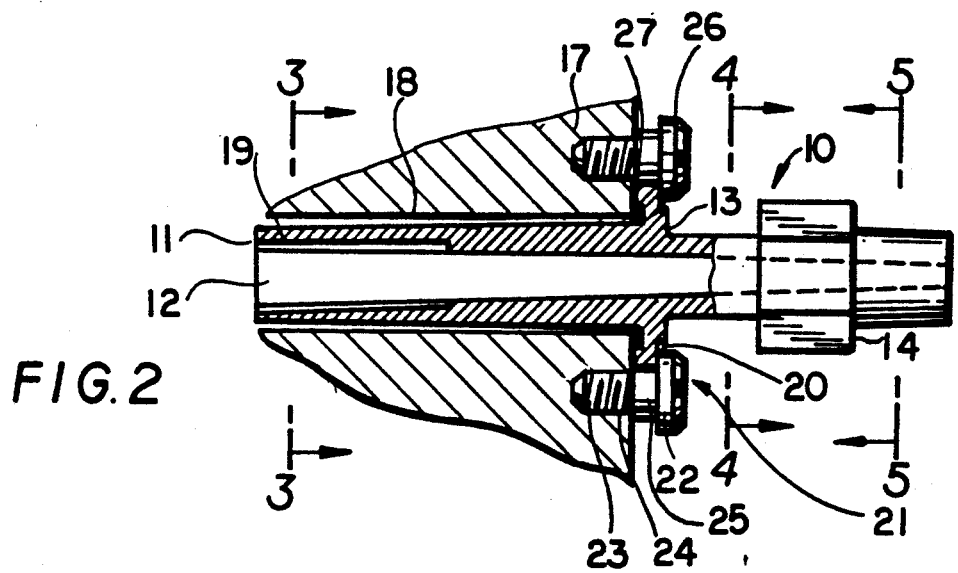
FIG. 2 is a cross sectional view of the resin injection port of the present invention.
Figure 4:
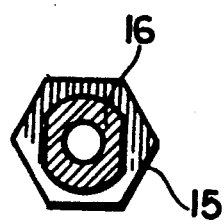
FIG. 4 is a view taken along line 4—4 of FIG. 2.

Referring to FIG. 2, a resin injection port 10 has a cylindrical portion 11, an inner passage 12, a flange 13 and a gripping portion 14 which preferably has flat faces 15 and/or 16 as shown in FIG. 4, to accept a wrench or other gripping tool. The port 10 is located in a mold 17 which has a corresponding socket 18 which accepts the cylindrical portion 11 therein. The cylindrical portion preferably has a gradual decrease in diameter towards the interior of the mold, with the socket correspondingly tapered to accept the cylinder therein, preferably with a close tolerance slip fit. Such a fit assists in holding the port in the mold and in preventing resin infiltration between the port and the mold. However, a non-tapered cylinder is also usable with the present invention, though the tapered cylinder is preferred.

Figure 3:
FIG. 3 is a cross-section of the port of FIG. 2 taken along line 3—3.

The passage 12 increases in diameter towards the interior of the mold. The taper assists in removing plastic from the passage after removal of the port from the mold. The passage is generally round and has grooves 19 in an end portion thereof. Preferably, the grooves penetrate partially through the wall of the port. FIG. 3 shows these to be four in number, semi-circular in cross-section and at locations 90° to each other; but any practical number, cross-section and location which provides the same function is acceptable.

The grooves extend for a limited portion of the length of the cylinder, as shown in FIG. 2. Preferably, the grooves extend for up to about 50% of the length of the cylindrical portion. During resin injection, these grooves fill with plastic, and after cure, provide a keyed fit for firmly gripping the cured plastic and forcing rotation and breakage at a designated location, i.e., at the end of the port.

Referring still to FIG. 2, the flange 13 has a pair of recesses 20 which are sized to accept bolts 21 having bolt heads 22 therein. Of course, there need not be a recess, as the bolt head may be flush with the face of the flange. Each bolt has a threaded portion 23, accepted by holes 24 in the mold 17 and an unthreaded portion 25 of somewhat larger diameter than the threaded portion. The unthreaded portion has a length which is equivalent to the thickness of the flange in the recess portion.

Thus, the recess portion fits snugly beneath the head of the bolt. For example a shoulder bolt having a shoulder length equal to the thickness of the flange could be used. Fully threaded bolts could also be used if of a proper length to assure seating of the flange beneath the bolt head. The bolts are fixed in place and need not be removed or readjusted to remove the port, which speeds part removal and turn-around of the mold.

To assure a good seal, the flange has a circular groove 26 which retains an O-ring 27 which is adequately compressed after full rotation and seating of the port on installation, i.e. when the recess is located beneath the bolt head.

Figure 5:
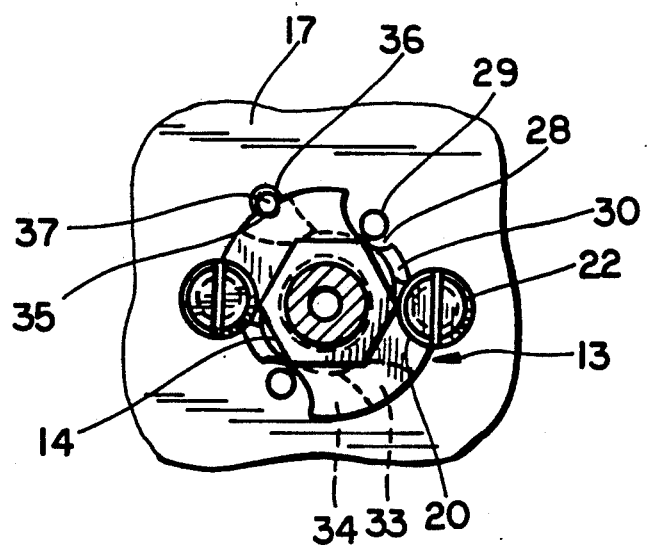
FIG. 5 is a view taken along line 5—5 of FIG. 2.

Referring to FIG. 5, the flange 13 has cut away portions 28 adjacent to a pair of pins 29, which extend outwardly from the mold. A pair of external cam surfaces 30 lead to the flange recess portions 20 within which the bolt heads are disposed. These cam surfaces provide a means for installing the port in the mold as the cut away portions 28 are first aligned with the bolt heads and then the port is rotated by engaging the gripping portion 14 and turning, such that the exterior cam surfaces 30 ride under the bolt heads until the bolt heads are disposed in the recesses 20, thus locking the port into position.

Figure 6A:
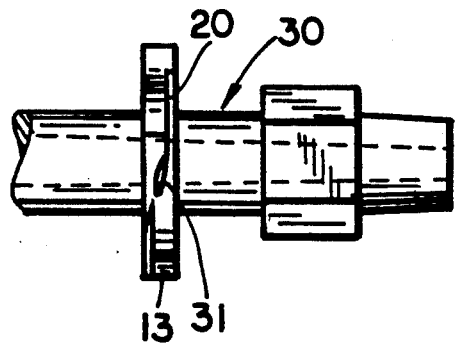
FIG. 6a and 6b are views taken along lines 6a-6a and 6b-6b of FIG. 5 showing the cam surfaces.

Referring to FIG. 6a, cam surface 30 has an inclined portion 31 which receives the bolt head and directs the head towards the recess 20 as the flange is rotated. This assists in compressing the O-ring to provide a good seal while locking the port in place. This also assures that the close tolerance fit is obtained between the cylindrical portion of the port and the mold socket.

Figure 6B:
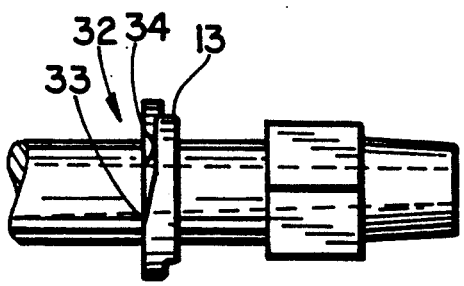

Referring to FIG. 6b, the flange 13 also has a pair of inner cam surfaces 32 which have inclined surfaces 33 and flat surfaces 34. These surfaces accept the pins 29 therein when the flange is moved to place the bolt head within the recess. Thus, when the bolt heads are aligned with the cutaway portions 28, the pins are in contact with the inner cam surfaces 32. As the flange is rotated, the inclined surface 30 rides along the pin and leads to the cut away portion, which has cleared the bolt head by its rotation. In FIG. 5, when the bolt head is received firmly by the recess, the pin is disposed in the cut away portion, though this need not always be the case.

To release the port from the mold, after injection and cure, the port is gripped by a wrench or other means and turned such that the flange now travels in the opposite direction, with the pin engaging the flat surface 34 and then traveling along the inclined surface 33 which forces the flange to travel away from the mold the length of the pin. Preferably the flat surfaces of the inner and outer cams allow rotation to break the cured resin within the port away from the cured part and/or passage 6 prior to outward movement of the port. Therefore, the cams for the pins and bolts should be designed to act in concert, such that by turning the flange for approximately a ¼ turn, the plastic is broken and the port is pushed from the mold by the pins. Following this action, the port simply slides out of the mold.

Referring again to FIG. 5, a notch 35 in the flange is provided as a means for preventing accidental rotation during injection. Once in position, the notch 35 is aligned with a hole 36 in the mold and a pin 37 is inserted into the hole. After resin injection and cure, the pin is removed to allow rotation of the flange.

By providing means for sequentially moving the port rotationally and outwardly by partial rotation, the plastic is broken away from the cured part, facilitating removal of both the part and the port. The grooves provided in the end of the port assure that the plastic will not simply turn within the port but is gripped firmly and forced to rotate with the port to assure breakage at the end of the port.

While preferred embodiments of the present invention have been shown and described, various changes and modifications could be made without varying from the scope of the present invention.

What is claimed is:

1. An injection port for supplying plastic to an interior cavity of a mold comprising a cylinder having an outer surface and a tapered inner passage, the inner passage increasing in diameter toward the interior of the mold, the inner passage having at least one longitudinal groove at an inboard end thereof, a flange, located on an end portion of the cylinder, means for retaining the flange against an outer surface of the mold, the means for retaining the flange being at least one fastener having a head and a threaded portion, the head locatable in a recess in the flange, and means for disengaging the port from the mold, the port being rotatable and removable from the mold.

2. The port of claim 1 wherein the means for disengaging the port comprise pins extending from the mold, inner cam surfaces located on the flange such that during rotation of the flange the cam surfaces engage the pins and force the flange to move outwardly.

3. The port of claim 1 wherein the cylinder has an outer surface reduced in diameter towards the interior of the mold.

4. The port of claim 1 further comprising means for gripping the port outwardly of the flange.

5. The port of claim 1 wherein the flange has a cutout portion located adjacent to each recess for receiving each fastener.

6. The port of claim 5 wherein an inclined surface is disposed between the cutout portion and the recess on the flange.

7. The port of claim 4 wherein the means for gripping the flange comprises a shank extending from the cylinder and having flat surfaces for receiving a gripping tool.

8. The port of claim 2 wherein the inner cam surfaces have a flat portion and an inclined portion.

9. The port of claim 1 wherein four grooves are provided on the inner passage disposed 90° degrees to each other.

10. The port of claim 1 further comprising a notch in the flange alignable with a hole in the mold, a removable pin disposable within the hole to prevent rotation of the flange.

11. The port of claim 1 wherein the groove penetrates partially into the cylinder forming the port.

12. The port of claim 1 wherein the groove extends for up to about 50% of the length of the cylinder forming the port.

13. An injection port for supplying plastic to an interior cavity of a mold comprising a cylinder having an outer surface and a tapered inner passage, the inner passage increasing in diameter toward the interior of the mold, the inner passage having at least one longitudinal groove at an inboard end thereof, a flange, located on an end portion of the cylinder, means for retaining the flange against an outer surface of the mold, and means for disengaging the port form the mold by rotation, the disengaging means being pins extending from the outer surface of the mold and inner cam surfaces located on the flange such that during rotation of the flange, the cam surfaces engage the pins and force the flange to move outwardly.

14. The port of claim 13 wherein the cylinder has an outer surface reduced in diameter towards the interior of the mold.

15. The port of claim 13 further comprising means for gripping the port outwardly of the flange.

16. The port of claim 13 wherein the means for retaining the flange comprise at least one fastener having a head and a threaded portion, the head locatable in a recess in the flange.

17. The port of claim 16 wherein the flange has a cutout portion located adjacent to each recess for receiving each fastener.

18. The port of claim 17 wherein an inclined surface is disposed between the cutout portion and the recess on the flange.

19. The port of claim 15 wherein the means for gripping the flange comprises a shank extending from the cylinder and having flat surfaces for receiving a gripping tool.

20. The port of claim 13 wherein the inner cam surfaces have a flat portion and an inclined portion.

21. The port of claim 13 wherein four grooves are provided on the inner passage disposed 90° to each other.

22. The port of claim 13 further comprising a notch in the flange alignable with a hole in the mold, a removable pin disposable within the hole to prevent rotation of the flange.

23. The port of claim 13 wherein the groove extends partially into the cylinder forming the port.

24. The port of claim 13 wherein the groove extends for up to about 50% of the length of the cylinder forming the port.

* * * * *